Figure 12:
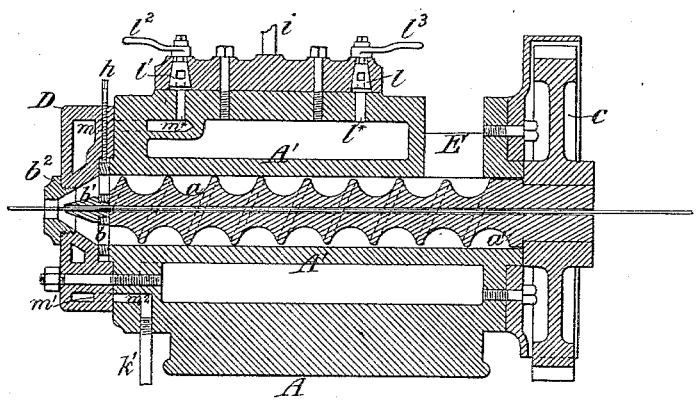

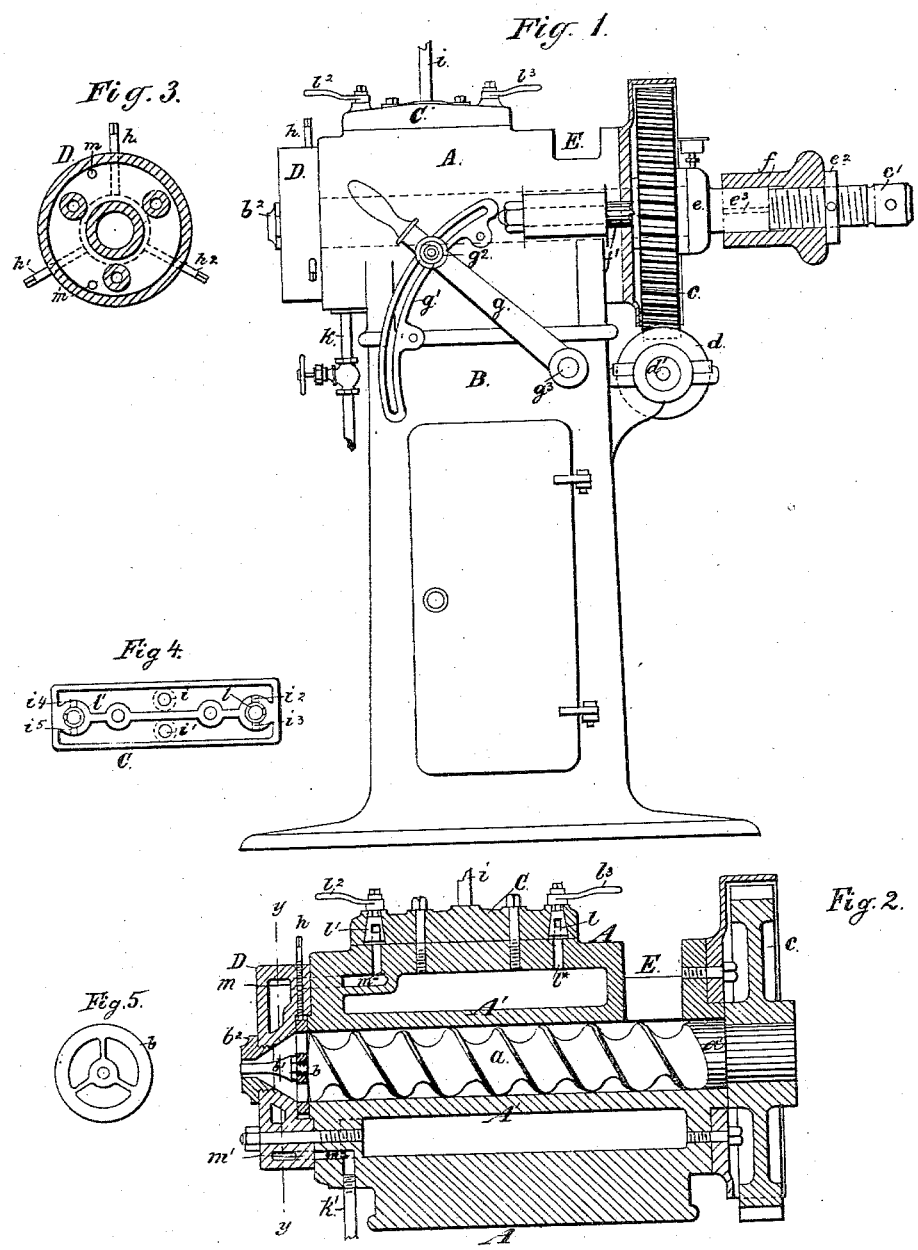

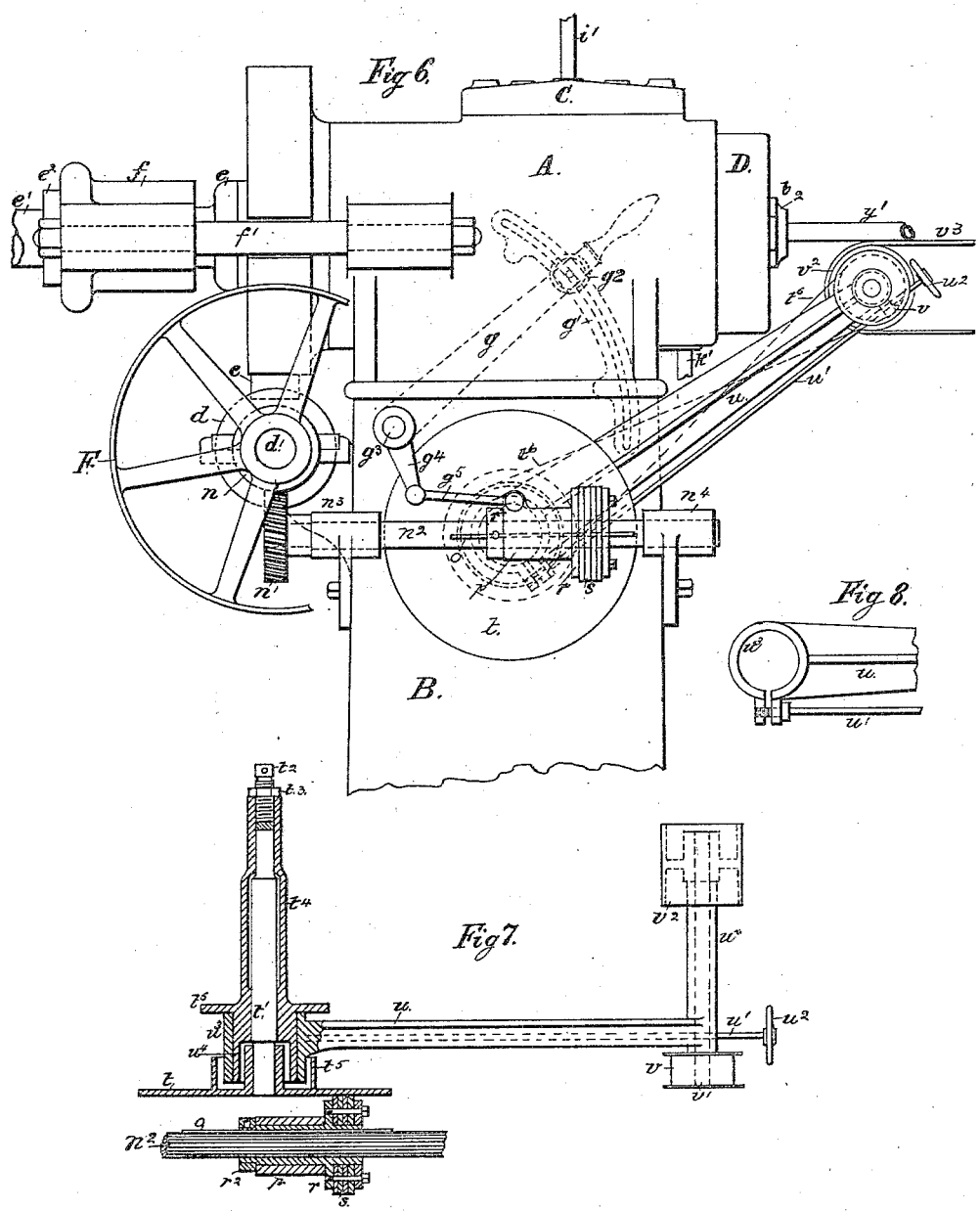

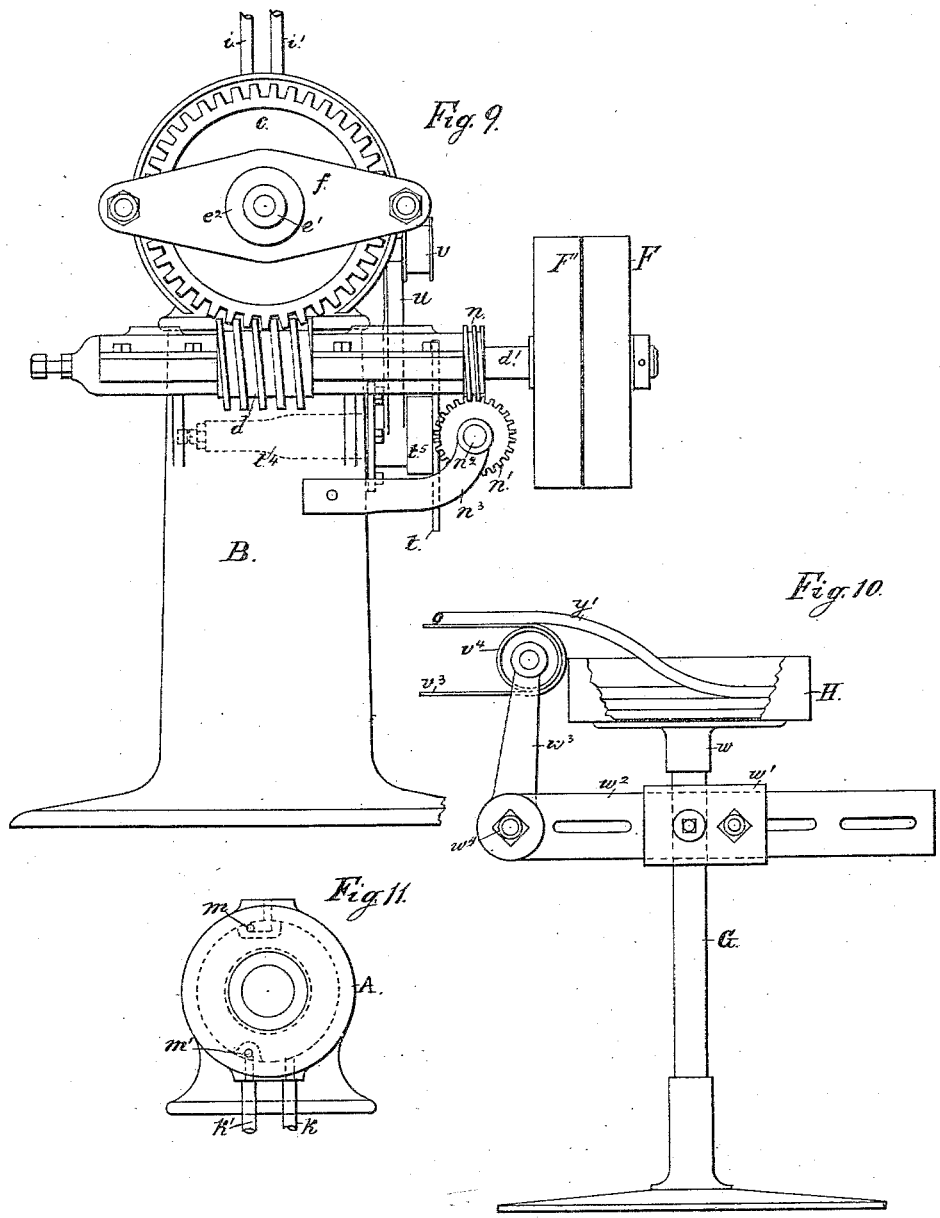

(No Model.) 4 Sheets—Sheet 4.
V. ROYLE & J. ROYLE, Jr.
MACHINE FOR MAKING TUBING AND CORD AND FOR COVERING
TELEGRAPH AND OTHER WIRES.

No. 325,363. Patented Sept. 1, 1885.

United States Patent Office.

VERNON ROYLE AND JOHN ROYLE, JR., OF PATERSON, NEW JERSEY.

MACHINE FOR MAKING TUBING AND CORD AND FOR COVERING TELEGRAPH AND OTHER WIRES.

SPECIFICATION forming part of Letters Patent No. 325,363, dated September 1, 1885.

Application filed December 26, 1884. (No model.)

*To all whom it may concern:*

Be it known that we, VERNON ROYLE and JOHN ROYLE, Jr., of the city of Paterson, in the county of Passaic and State of New Jersey, have invented a new and useful Improvement in Machines for Making Tubing and Cord and for Covering Telegraph and other Wires, of which the following is a specification, reference being had to the accompanying drawings, forming part of this specification.

This invention relates more particularly to machines for making tubing of india-rubber, gutta-percha, or other materials of a plastic nature or capable of reduction to a plastic condition; but machines in most respects resembling those for making tubing of the kind above mentioned and embodying parts of our invention, may be used for the manufacture of cord or rope of similar materials, and for covering telegraph and other wires with similar materials.

The principal essential parts of a machine embodying our invention are generally a trunk or cylinder to which the plastic material is supplied, a screw fitted to the said trunk or cylinder for forcing the plastic material through and from the said trunk or cylinder with the requisite pressure, and a die in the head of the said trunk or cylinder through which the material is forced, and which gives form to the exterior of the tubing, cord, or wire-covering to be produced. A core also is employed to give form to the interior of the tube in a machine for making tubing and to steady and center the wire in a machine for covering wire, but such core being omitted in a machine for making cord. There is also a delivery-apron for receiving the formed product of the die. Some parts of our invention might, however, be applicable to machines in which some other means common to machinery for making tubing—a ram, for instance—is used for forcing the plastic material through the die.

Our invention consists in certain novel means of heating and regulating the heat of the body, trunk, or cylinder, and the head thereof, which contains the die and forming devices, whereby the several parts of the machine are brought to a proper temperature and the plastic material under operation is kept properly tempered for obtaining the best results.

Our invention also consists in certain provision for the adjustment of the core, when one is used in the machine, whereby its concentricity to the die is assured.

It also consists in certain means of receiving the end-thrust of the pressure-screw, and of adjusting the said screw in its proper relation to the die and core of the machine.

It also consists in certain means of driving the delivery-apron, whereby provision is afforded for varying and controlling the speed thereof that it may always correspond with the speed of the delivery of the tubing or other fabric from the die in its plastic state, so that the said fabric may be delivered without being stretched, as it would be if the apron were too fast, and without being caused to become serpentine or wrinkled, as it would if the apron were too slow.

It also consists in certain details of construction hereinafter described and claimed.

We will now proceed to describe the invention in detail in its application to a machine for making tubing, and afterward to briefly describe some modifications which are necessary to adapt it to other purposes.

Figure 1 is a side elevation of the machine for making tubing. Fig. 2 is a central vertical sectional view of the trunk and its appurtenances. Fig. 3 is a transverse section of the head in the plane indicated by the line *y y* in Fig. 2. Fig. 4 is an inverted plan of the valve-chest for controlling the admission of steam and water to the jacket of the trunk for tempering the same. Fig. 5 is a face view of the adjustable core-bridge. Fig. 6 is an elevation of the upper part of the machine viewed from the opposite side to Fig. 1. Fig. 7 is a plan, mostly in section, of the means of adjusting and driving the delivery-apron. Fig. 8 is a side view of part of the details of Fig. 7. Fig. 9 is an elevation of the machine as viewed from the right of Fig. 1 or left of Fig. 6. Fig. 10 is a side elevation of the apparatus which receives the formed tube on its delivery from the machine. Fig. 11 is an elevation of that head of the trunk presented at the left of Fig. 1 or right of Fig. 6. Fig. 12 is a central longitudinal section of the trunk, the pressure-screw, the die, and the core as constructed for covering wire. Figs. 1, 3, 9, 10, 11 are on a similar scale. The other figures are on a slightly larger scale.

Similar letters of reference indicate corresponding parts in the several figures.

B is a standard, upon the top of which is constructed or firmly secured, the trunk A A', which consists of a truly-bored horizontal cylinder, A', surrounded by a jacket, A. To one end of this trunk is bolted the annular head D, in which is secured the nozzle $b^2$, or, as it may be termed, the die for giving form to the exterior of the tubing made by the machine, and which contains the core $b'$, for giving form to the interior of the said tubing, and also contains the adjustable bridge $b$, which holds the said core.

In the cylinder A' is placed the presser, which, as shown in Fig. 2, consists of a screw, $a$, having a solid center, and having the center circumference of its thread fitting snugly to the bore of said cylinder, a portion of the stock of the said screw being left plain, as shown at $a'$, to close the end of the cylinder A' farthest from the head D. A feed-opening, E, is provided in the top of the cylinder near that end.

To the end of the stock of the screw $a$ which projects beyond that end of the cylinder last mentioned, is firmly secured a worm-wheel, $c$, through which the screw is capable of receiving a slow rotary motion from an endless screw, $d$, on the main shaft $d'$ of the machine. To the same end of the cylinder is secured by strong bolts or rods $f'$, one on each side, a yoke or fixed cross-head, $f$, into the center of which is screwed the adjustable bearing-screw $e'$, which is exactly in line with the pressure-screw $a$, and which serves as an abutment for the pressure-screw, to sustain the latter in its operation of forcing the material through the cylinder and the die by its rotary motion within the cylinder. The opposite end of the pressure-screw $a$ is about flush with the corresponding end of the cylinder A', and as close as practicable to the core-bridge $b$, the thread being continued to the said end, and the spiral cavity of the thread being open to the said end.

A jam-nut, $e^2$, is applied on the bearing-screw $e'$, at the back of the yoke $f$, for the purpose of securing the said screw against turning when properly adjusted in relation to the trunk or cylinder and the core-bridge and die. Between the inner end of the abutment-screw $e'$ and the corresponding end of the pressure-screw $a$, there is a broad-headed thrust-pin, which is fitted to the yoke $f$ and prevented from turning therein by a feather, $e^3$, the said pin receiving and transmitting to the said screw $e'$ the thrust of the pressure-screw when the latter is in operation.

The adjustable core-bridge $b$, before mentioned, is in the form of a flat circular disk having a solid center, which is drilled and tapped for the reception of the core $b'$, and into which the core is screwed firmly, and around this solid center are openings, as shown in Figs. 2 and 5, for the passage through it of the material of which the pipe is to be formed. This bridge is received in a circular cavity, of larger circumference than its own exterior, provided in the inner face of the head D, which abuts against the end of the trunk A A', and the said bridge is fitted snugly but movably, as by a ground joint, between the face of said cavity and the end of the cylinder A', so that it may be adjusted by means of radially-arranged adjusting-screws $h$ $h'$ $h^2$, screwing through the sides of the head D, for the purpose of adjusting it and the core to bring the latter perfectly concentric with the die $b^2$, which is screwed into the central opening provided in the head D. This central opening and the adjacent back part of the interior of the die are tapered, as shown in Fig. 2, to render easy the passage of the plastic material from the pressure-cylinder to the die, the outer portion of which, in which the exterior of the tubing is formed, is bored cylindrically. The die being screwed into the head is easily removable to provide for the use of dies of different sizes, according to the external size of the tubing to be made; and the core being screwed into the core-bridge can also be removed and another of different size substituted.

The head D, the construction of which is fully illustrated in Figs. 2 and 3, has within it an annular cavity, whereby is constituted a jacket for the reception of steam or water for tempering the die and core and surrounding plastic material independently of the cylinder A' and its contents.

On the top of the jacket A of the trunk there is a steam and water chest, C, which is divided longitudinally by a central partition, as shown in the inverted plan, Fig. 4, into two compartments, one of which is always kept supplied with steam by a pipe, $i$, and the other with cool water by a pipe, $i'$, for the purpose of supplying either steam or water to the interior of the jacket A of the pressure-cylinder, or to the annular jacket formed in the head D, or to both of the said jackets, as may be desired.

To provide for the distribution of the steam and water, there are fitted into the partition in the steam and water chest C, two valves or cocks, $l$ $l'$, the former, $l$, to form communication between either compartment of the chest and the jacket of the cylinder, and the latter, $l'$, to form communication between either compartment of the said chest and the jacket in the head D. These cocks or valves may be of any suitable kind. Those represented are cocks having hollow plugs which are closed at the top but open at the bottom. In each hollow plug there is a single lateral opening, as shown in Fig. 2, and in the plug-seat of each there are two opposite openings, $i^2$ $i^3$ or $i^4$ and $i^5$, as shown in Fig. 4, ranging with the lateral opening in its plug and communicating one with the steam-compartment and the other with the water-compartment of the chest C. Under the cavity of the plug $l$ there is a downward passage, $l^*$, (see Fig. 2,) directly into the jacket A, and under the cavity of the plug of $l'$ is a downward passage, $m^*$, branching off horizontally through the end of the jacket, where it communicates with an opening, $m$, (see Figs. 2 and 3,) provided in the jacket portion of the head D. By turning the cock $l$ by its handle $l^3$, to bring the lateral opening of its plug into communication with the opening $i^2$ or $i^3$, either steam or water, as the case may be, will be admitted through the said plug and passage $l^*$ to the cylinder-jacket. In like manner, by turning the cock $l'$ by its handle $l^2$, to bring the lateral opening of its plug into communication with the opening $i^4$ or $i^5$, either steam or water will be admitted through $m^*$ and $m$ to the jacket of the head. In this way the jacket, with its contents, and the head, with its contents, including the die and core, may be separately tempered to that degree which is found best for the working of the plastic material of which the tubing is being made, and which is delivered in the required tubular form from the die $b^2$, through which it is forced by the pressure screw.

At the bottom of the trunk A, near the head D, is an escape-pipe, $k$, (see Figs. 1 and 11,) for the escape of the cooling-water and the water of condensation from the jacket of the cylinder, and near the pipe $k$ is another pipe for the escape of the cooling-water and water of condensation from the jacket of the head D. In order to provide for the removal of the head D without disturbing its escape-pipe connection, the said pipe is attached to the trunk, as shown in Fig. 2, and a passage, $m'$, is drilled into the jacket of the head from the inner face, and a corresponding passage from the end of the cylinder, to communicate with the said pipe, as illustrated at $m^2$ in Figs. 2, 3, and 11. In like manner the removal of the head D, without disturbing any other connection with the chest C, is provided for by the passages $m$ and $m^*$, hereinabove described.

The main shaft $d'$ of the machine, which works in a long bearing secured to the standard B, is arranged transversely to the axis of the pressure-screw $a$. It is provided with fast and loose pulleys F F', and besides being furnished with the endless screw $d$, hereinbefore mentioned, gearing with the worm-wheel $c$ on the said screw $a$, the said shaft is furnished with another endless screw, $n$, (see Figs. 6 and 9,) for the purpose of giving motion to the delivery-apron $v^3$, as will be hereinafter described.

The said delivery-apron $v^3$, which is horizontally arranged in front of the trunk and the die $b^2$, has that part of its upper surface next the trunk as much lower than the axis of the die as the semi-diameter of the exterior of the tubing to be formed. In order to provide for the adjustment of said apron to the proper height according to the varying sizes of the tubing, and also to permit the lowering of the part of said apron next the trunk entirely out of the way of the head, as may be required for the removal of the latter to take out the core-bridge and change the core, or for any other purpose, the shaft $v'$ of the drum $v^2$ which supports that part of the apron, and which receives the motion for driving the said apron, is supported in a bearing-box, $u^*$, on the end of a long adjustable bracket, $u$. (Shown in Figs. 6 and 7.) This bracket $u$ is made with a hub, $u^3$, which fits the cylindrical exterior of a projection, $u^4$, on a box, $t^4$, (see Figs. 7 and 9,) which contains the bearings for a shaft, $t'$, which carries a pulley, $t^5$, for driving the delivery-apron $v^3$ by a band, $t^6$, (shown in Fig. 6,) running on the said pulley and on a pulley, $v$, on the shaft $v'$ of the apron-drum $v^2$. (See Figs. 6, 7, and 9.) This box $t^4$, which extends nearly through the standard B, is provided with a flange, $t^6$, (see Fig. 7,) through which it is bolted to the exterior of the said standard.

To provide for adjusting and securing the bracket $u$ and dropping it down to remove the apron out of the way without disturbing the band $t^6$ or disarranging the driving mechanism, the hub $u^3$ of the bracket is constructed to serve as a clamp by being slit in a direction parallel with its axis, and having on opposite sides of the said slit, as shown in Figs. 6 and 8, lugs which are fitted with a screw, $u'$, which serves the purpose of drawing the said lugs toward each other, and so effecting the tightening of the said clamp upon the projection $u^4$ on the stationary box $t^4$, and thereby securing the bracket in any position in which it may be placed, by turning it on the said projection and box, the said hub, when the screw $u'$ is unscrewed, fitting the said projection easily enough to permit the bracket to be turned thereon by hand. The said screw $u'$ is made with a long shank, which extends beyond or to a point near the box $u^*$ on the extremity of the bracket $u$, where it is furnished with a handle, $u^2$, so that the said screw can be conveniently worked by the attendant who is adjusting the apron to the proper height.

To provide for giving to the pulley $t^5$ on the shaft $t'$, the necessary motion for driving the delivery-apron, there is secured to the said pulley and its shaft, a friction-disk, $t$, against the face of which works the periphery of a friction-wheel, $r$ $s$, on a horizontal shaft, $n^2$, which is arranged transversely to the driving-shaft $d'$ and the shaft $t'$ in bearings $n^3$ $n^4$, bolted to the standard B, and which is furnished with a worm-wheel, $n'$, through which it receives from the endless screw $n$, hereinbefore mentioned, on the driving-shaft, the motion which it imparts to the disk $t$ and pulley $t^5$ for driving the apron $v^3$ at the slow rate of motion necessary to it.

In order that the speed of the apron may be varied and regulated to make it agree exactly with the speed of the delivery of the tube $y'$, from the die $b^2$, that it will not, by being too slow, cause the plastic tubing to be projected upon it in serpentine form, or by being too fast cause the tubing to be stretched, the friction-wheel $r\,s$ is fitted to the shaft $n^2$ with a feather, $o$, in such manner that though it must turn with the said shaft, it may slide lengthwise thereon for the purpose of presenting its periphery nearer to or farther from the center of the disk $t$. For the purpose of so sliding the said wheel on the said shaft, the hub of the said wheel is fitted, as shown in Figs. 6 and 7, with a loose sleeve, $p$, which is confined longitudinally by a nut or collar, $r^2$, but within which the said hub turns freely; and the said sleeve is connected by a rod, $g^5$, (see Fig. 6,) with the arm $g^4$, which is fast on fulcrum-shaft $g^3$ of a hand-lever, $g$, (see also Fig. 1,) by the movement of which the friction-wheel is moved on its shaft. To secure the adjustment of the said wheel there is secured to the standard B, a stationary slotted sector-plate, $g'$, to which the hand-lever $g$ may be secured in its adjusted position by a clamping-screw, $g^2$. This clamping-screw will, however, generally be left loose, and the attendant, holding the lever $g$ in his hand, will watch the delivery of the tubing on the apron and move the lever as may be necessary to increase or diminish the speed of the apron relatively to the speed of the driving-shaft, and pressure according to the speed of delivery, which will vary considerably according to the size of the tube produced, and will also vary in some degree with the very slight variations which are unavoidable in the speed of delivery from the die.

The friction-wheel $r\,s$ may have its peripherical surface constructed in any suitable manner. It is represented as having the said surface composed of the edges of a series of disks, $s$, of india-rubber or other suitable material clamped together. In order to insure a proper degree of friction between the said wheel and the face of the disk $t$, an adjusting-screw is screwed into the back end of the box $t^4$, as shown in Fig. 7, for the purpose of pressing against the rear end of the shaft $t'$, and a jam-nut is applied to the said screw outside of the said box.

The method of supporting and adjusting the outermost part of the apron $v^3$, or that part thereof farthest from the trunk A A', and of collecting the tubing from said apron, is illustrated in Fig. 10, and will now be described.

G is a movable standard having a broad base, and heavy enough to stand in any position in which it may be placed on a floor. To this standard a cross-head or rigid arm, $w^2$, is adjustably secured by a screw-clamp, $w'$, which permits the said cross-head to be secured at any suitable height. To one end of the said cross-head is attached a bracket, $w^3$, which contains or carries the bearing for the shaft of the drum $v^4$, which supports the outer part of the apron. On the top of the said standard is placed a circular pan, H, which is so concentrically fitted to the said standard as to be capable of turning freely thereon, the said pan being so placed relatively to the said apron as to be capable of receiving the tubing from the said apron, and to enable the tubing so received to be coiled up within it by the rotation of the said pan, which may be produced by the hand of an attendant, who stands by with a brush with which he dusts upon the exterior of the tubing, soapstone-powder or other material, for the prevention of the sticking together of the coils of the tubing. The bracket $w^3$ is adjustable on or by the pin $w^4$, which connects it with the cross-head $w^2$ in such manner as to provide for setting the drum $v^4$ as close as possible to the pan without touching it. This adjustment is desirable, as the pans for different sizes of tubing will be of different sizes. The cross-head $w^2$ is adjustable in the direction of its length, or horizontally, by the clamp $w^2$, for the same purpose.

In the modification shown in Fig. 12, to adapt the machine to the covering of wire, the pressure-screw $a$, instead of being solid, has a central bore large enough to allow the wire to be covered to pass through it, and the core $b'$ is also bored centrally to allow the wire to pass through it, the said core being tapered to its extremity, which terminates at the entrance to the cylindrical portion of the die.

A machine for making cord needs not to differ in any other respect from that for making tubing, except that no core is required in the former.

We are aware of Letters Patent No. 37,112, granted to T. Sault, December 9, 1862, and of other Letters Patent showing and describing a jacketed pressure-cylinder having at the end an outlet nozzle or die, and containing a screw which by its rotation expels the plastic material from the said die. We do not desire to cover, broadly, such a machine as of our invention.

We are not aware that any machines heretofore made for the purpose have had a core arranged in the die and supported at its inner end by a core-bridge which is adjustable transversely to the axis of the cylinder in order to preserve the concentric position of the core and die. We are aware that the machines heretofore used have had provision for supplying steam or cold water to the jacket of the cylinder; but we believe it to be new to also provide the head of the cylinder with a jacket which may also be supplied with steam or cooling-water at will, and independently of whether the cylinder-jacket is supplied with steam or cool water. The construction of the cylinder with a chest having a partition dividing it into compartments for steam and cooling-water, and with valves and passages whereby steam or water may be supplied at will to the jackets surrounding the cylinder and its head, is very advantageous in using the machine for different materials and for different purposes. None of the machines heretofore used for the purpose has had combined with it a delivery-apron onto which the cord, tube, or wire is delivered from the die, and mechanism for varying the speed of the apron to correspond to the speed at which the continuous cord, tube, or wire issues from the die.

What we claim as our invention, and desire to secure by Letters Patent, is—

1. The combination, with the pressure-cylinder, presser, and die of a machine for making tubing or covering wire, of a core made separate from the presser, and a core-bridge supporting the core at its inner end and adjustable transversely to the axis of the core and die for the purpose of adjusting the core concentric with the die, substantially as herein described.

2. The combination, with the pressure-cylinder and head and pressure-screw of a machine for making tubing or covering wire, and the die and core within said head, of an adjustable core-bridge arranged within said head and supporting the core at its inner end, and set screws arranged in said head transversely to the axis of the die and core, and serving to adjust said core-bridge from the exterior of said head, substantially as herein described.

3. The combination, with the body of the pressure-cylinder and its removable head containing a die, of the core arranged within the die, a core-bridge supporting the core at its inner end, arranged and held in place in a concavity between the inner face of said cylinder and head and adjustable in a direction transverse to the axis of the cylinder, substantially as herein described.

4. The combination, in a machine for making tubing or cord or covering wire, of a pressure-cylinder and a hollow head attached to the end of said cylinder and containing the forming-die, separate jackets to the said cylinder and head, and cocks for introducing steam or cooling-water to each of the two jackets independently of the other, substantially as herein described.

5. The combination, with the jacketed pressure-cylinder, of a chest, C, divided by a partition into two compartments, one for steam and the other for cooling-water, a valve-seat having passages communicating with the jacket and with both compartments of the chest, and a cock or valve for bringing the passage from either compartment into communication with the said jacket, whereby provision is afforded for supplying steam or water to the jacket, substantially as herein described.

6. The combination, with the pressure-cylinder and its head having separate jackets, of a chest divided by a partition into two compartments, one for steam and the other for cooling-water, and each common to both jackets, and two valves or cocks in the said chest, each having a communication with the two compartments, and one having a communication with the jacket of the head for controlling the supply of either steam or water to either jacket from one chest, substantially as herein described.

7. The combination, with the jacketed pressure-cylinder, having on it a steam and water chest from which a passage, $m^*$, runs to the end of the cylinder, of the separately-jacketed head D, having an opening, $m$, to the jacket arranged to communicate with the passage $m^*$, whereby provision is afforded for the removal of the said head without disturbing any other connection with the chest D, substantially as herein described.

8. The combination, with the pressure-cylinder and its jacketed head D, of the escape-pipe $k'$, communicating with a passage, $m^2$, through the end of the cylinder corresponding with an opening, $m'$, in the jacket of the head, to provide for the removal of the head without disturbing its escape-pipe, substantially as herein described.

9. The combination, with a pressure apparatus and die for forming pipe or cord of plastic material, of a delivery-apron the speed of which is variable at will relatively to the speed of the pressure apparatus during the operation of the machine, substantially as herein described.

10. The combination, with the main shaft $d'$ of the machine, and the apron-driving pulley $t^5$ and its shaft $t'$, of the shaft $n^2$, geared with said driving-shaft, the friction-wheel $r$ $s$, movable lengthwise on said shaft, and the friction-disk $t$ on the shaft $t'$, all substantially as and for the purpose herein described.

11. The combination, with one of the drums and drum-shafts of the delivery-apron, and a shaft for transmitting motion to the said drum-shaft, of a bracket for carrying the bearing of the said drum-shaft adjustable around said driving-shaft, substantially as and for the purpose herein described.

12. The combination, with the delivery-apron drum $v^2$, its shaft $v'$, and pulley $v$, the apron-driving pulley $t^5$, its shaft $t$, and the box $t^4$ for said shaft, of the removable bracket $u$, adjustably clamped around said box and containing the bearing for the said shaft $v'$, substantially as herein described.

13. The combination, with a movable stand for supporting the outer drum-shaft of the delivery-apron, and a pan or receptacle for the pipe or cord as it is delivered from the said apron, of an adjustable support on said stand for supporting the said drum-shaft and permitting its adjustment relatively to said receptacle, substantially as and for the purpose herein described.

VERNON ROYLE.
JOHN ROYLE, Jr.

Witnesses:
C. F. MAGER,
SIDNEY FARRAR.